(«12») United States Patent
Meck

(10) Patent No.: US 9,169,913 B2
(45) Date of Patent: Oct. 27, 2015

(54) MECHANISM FOR TOOTH CLEARANCE ADJUSTMENT AND LINEAR ACTUATION

(75) Inventor: Tobias Meck, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 434 days.

(21) Appl. No.: 13/604,067

(22) Filed: Sep. 5, 2012

(65) Prior Publication Data

US 2013/0233102 A1    Sep. 12, 2013

(30) Foreign Application Priority Data

Mar. 7, 2012  (DE) .................... 20 2012 100 803 U

(51) Int. Cl.
| | |
|---|---|
| *F16H 27/02* | (2006.01) |
| *F16H 29/02* | (2006.01) |
| *F16H 29/20* | (2006.01) |
| *F16H 55/18* | (2006.01) |
| *F16H 55/28* | (2006.01) |

(52) U.S. Cl.
CPC ........... *F16H 55/28* (2013.01); *Y10T 74/18808* (2015.01); *Y10T 74/19623* (2015.01)

(58) Field of Classification Search
CPC ....... F16H 57/12; F16H 55/18; F16H 1/2863; F16H 55/24; F16H 55/28; F16H 2057/125; B23Q 5/56; B23Q 5/3385; B23Q 1/28; B23Q 16/00; B25J 9/103; B60N 2205/20
USPC ............ 74/89.16, 89.17, 89.18, 89.19, 89.42, 74/109, 409, 422, 440, 395, 832, 29, 30, 74/76, 79, 130–135, 424.6, 388 PS; 384/40, 247, 269, 519, 532; 180/417, 180/427, 428, 444; 474/101, 113, 131

See application file for complete search history.

(56) References Cited

U.S. PATENT DOCUMENTS

| | | | | |
|---|---|---|---|---|
| 1,562,996 | A * | 11/1925 | Van Dresser ................... | 74/842 |
| 2,467,066 | A * | 4/1949 | Wilson ............................ | 384/40 |
| 2,571,265 | A * | 10/1951 | Leufven ......................... | 411/434 |
| 2,810,299 | A * | 10/1957 | Partridge ........................ | 74/409 |
| 2,946,232 | A * | 7/1960 | Jones .............................. | 74/409 |
| 3,060,762 | A * | 10/1962 | Lutz ............................... | 74/499 |
| 3,119,307 | A * | 1/1964 | Opferkuch .................... | 409/146 |
| 3,252,348 | A * | 5/1966 | Folkerts ......................... | 74/409 |
| 3,310,990 | A * | 3/1967 | Zettel ............................. | 74/409 |
| 3,338,140 | A * | 8/1967 | Sheesley ........................ | 92/5 R |
| 3,370,478 | A * | 2/1968 | Martin ........................... | 74/395 |
| 3,600,965 | A * | 8/1971 | Folkerts ......................... | 74/339 |
| 3,631,935 | A * | 1/1972 | Seed .............................. | 177/174 |

(Continued)

FOREIGN PATENT DOCUMENTS

| | | |
|---|---|---|
| DE | 1204906 | 11/1965 |
| DE | 217292 | 1/1985 |

(Continued)

*Primary Examiner* — William Kelleher
*Assistant Examiner* — Jake Cook
(74) *Attorney, Agent, or Firm* — Fish & Richardson P.C.

(57) ABSTRACT

This invention relates to a mechanism for tooth clearance adjustment and linear actuation. In certain aspects of the invention, a mechanism for gear clearance adjustment comprises a retaining element, on which a first gear wheel is mounted, and a carrier element, on which a gear rack or a second gear wheel is mounted. The carrier element or on the retaining element includes at least one clearance adjustment device arranged by a fastening device.

10 Claims, 4 Drawing Sheets

(56) References Cited

U.S. PATENT DOCUMENTS

| | | | |
|---|---|---|---|
| 3,828,622 A * | 8/1974 | Neff | 74/409 |
| 3,861,815 A * | 1/1975 | Landaeus | 403/370 |
| 4,091,686 A * | 5/1978 | Seitz | 74/409 |
| 4,093,052 A * | 6/1978 | Falk | 192/85.12 |
| 4,182,215 A * | 1/1980 | Green et al. | 411/434 |
| 4,303,150 A * | 12/1981 | Olsson | 192/85.12 |
| 4,311,063 A * | 1/1982 | Sistare | 74/395 |
| 4,341,484 A * | 7/1982 | Peterson et al. | 403/5 |
| 4,393,567 A * | 7/1983 | Disborg | 29/421.1 |
| 4,532,822 A * | 8/1985 | Godlewski | 74/397 |
| 4,580,460 A * | 4/1986 | Chang et al. | 74/409 |
| 4,580,796 A * | 4/1986 | Baur et al. | 279/4.02 |
| 4,619,155 A * | 10/1986 | Futaba | 74/498 |
| 4,640,148 A * | 2/1987 | Hasegawa | 74/422 |
| 4,724,717 A * | 2/1988 | Chikuma | 74/498 |
| 4,746,227 A * | 5/1988 | Sato | 384/13 |
| 4,893,518 A * | 1/1990 | Matsumoto et al. | 74/493 |
| 4,923,320 A * | 5/1990 | Klischat | 403/5 |
| 5,341,701 A * | 8/1994 | Krom et al. | 74/499 |
| 5,845,532 A * | 12/1998 | Phillips | 74/422 |
| 5,855,446 A * | 1/1999 | Disborg | 403/31 |
| 5,888,159 A * | 3/1999 | Liao | 474/116 |
| 5,906,133 A * | 5/1999 | Gilbert | 74/409 |
| 6,019,012 A * | 2/2000 | Cartwright | 74/409 |
| 6,179,468 B1 * | 1/2001 | Thorstens et al. | 384/40 |
| 6,269,709 B1 * | 8/2001 | Sangret | 74/398 |
| 6,543,569 B1 * | 4/2003 | Shimizu et al. | 180/444 |
| 6,729,986 B2 * | 5/2004 | Kurohata et al. | 474/110 |
| 7,748,288 B2 * | 7/2010 | Chevalier et al. | 74/409 |
| 8,667,858 B2 * | 3/2014 | Fuechsel et al. | 74/388 PS |
| 2003/0115980 A1 * | 6/2003 | Sickert et al. | 74/409 |
| 2003/0166428 A1 * | 9/2003 | Beardmore | 474/110 |
| 2004/0222036 A1 * | 11/2004 | Berhard et al. | 180/444 |
| 2005/0039554 A1 * | 2/2005 | Bieber et al. | 74/29 |
| 2007/0012130 A1 * | 1/2007 | Chevalier et al. | 74/409 |
| 2009/0320630 A1 | 12/2009 | Bayer et al. | |
| 2010/0140011 A1 * | 6/2010 | Wilkes et al. | 180/444 |
| 2014/0174843 A1 * | 6/2014 | Kimoto | 180/444 |
| 2014/0216184 A1 * | 8/2014 | Meyer et al. | 74/30 |
| 2014/0338486 A1 * | 11/2014 | Taenaka et al. | 74/422 |

FOREIGN PATENT DOCUMENTS

| | | |
|---|---|---|
| DE | 102004007448 A1 | 9/2005 |
| DE | 112006001731 T5 | 6/2008 |
| DE | 200820015081 U | 5/2010 |

\* cited by examiner

US 9,169,913 B2

MECHANISM FOR TOOTH CLEARANCE ADJUSTMENT AND LINEAR ACTUATION

CROSS REFERENCE TO RELATED APPLICATION

This application claims priority under 35 U.S.C. §119(a) to German Application No. 20 2012 100 803.3, filed on Mar. 7, 2012, the entire contents of which are hereby incorporated by reference.

TECHNICAL FIELD

This invention relates to a mechanism for gear tooth clearance adjustment, as well as a linear actuator.

BACKGROUND

It is necessary for tooth meshing clearance and tooth tip clearance to be set on gear wheel or rack and pinion drives to achieve precise adjustment movement. If such a tooth tip clearance is too large, a traversing path may be incorrectly adjusted such that, for example, a machining operation on a workpiece, which is arranged on a traversable carriage, may be inexactly executed. If the tooth tip clearance is too small, there is increased wear between the gear rack and the gear wheel.

A linear actuator, in particular a rack and pinion drive, is known from DE 10 2004 448 A1, in which the tooth tip clearance between a gear wheel and a gear rack can be adjusted by means of an actuator. This actuator is known, for example, as a piezo actuator, a shape memory actuator, or an electrically or hydraulically operated actuator, which adjusts a gear wheel to the height of the gear rack in order to ensure zero backlash/freedom from play and dual-flank contact.

In order to achieve an adjustment of the tooth clearance and tooth tip clearance with a high level of accuracy, the existing version requires a very high-quality and space-consuming actuator and control system design, which is very expensive.

SUMMARY

In some aspects of the invention, a mechanism for tooth clearance adjustment and a linear actuator with a mechanism for tooth clearance adjustment makes a precise adjustment of the tooth clearance and tooth tip clearance possible in a simple fashion and in a short time span.

In one aspect of the invention, a mechanism for tooth clearance, in which at least one clearance adjustment device is arranged with a fastening device on the carrier element or retaining element, can be used in an unfastened state for the adjustment of a gap in a radial direction between the gear wheel (e.g., first gear wheel) and the gear rack or between the gear wheel and an additional gear wheel (e.g., second gear wheel), and then converted to the fastened state after the adjustment of the gap in order to secure the adjusted gap. For this purpose the fastening device has a clamping bush containing a pillar guide, which is linked directly or indirectly to the gear wheel, the gear rack or the additional gear wheel, by which means the pillar guide can be moved in an axial direction within the clamping bush when the clamping bush is in an unfastened state. The design of the clearance adjustment device with the fastening device is advantageous in that the clearance of the teeth between the gear rack and the gear wheel or between two gear wheels can be adjusted freely, and after the exact clearance has been adjusted by locking the fastening device, secured without resulting in an alteration or adjustment to the attitude or position of the components to be clamped. The adjusted clearance is secured without having been changed. This enables the tooth tip clearance to be adjusted quickly and precisely.

In some embodiments, the fastening device comprises a clamping bush, which can be inserted into the retaining element or the carrier element. The clamping bush loading force acts in a radial direction, so that the pillar guide can freely be moved axially while the clamping bush is in the unloaded condition, in order to adjust the tip clearance between the gear wheel and the gear rack or the additional gear wheel. Then, with the clamping bush in the loaded condition, the clamping bush exerts a radial clamping force, through which the pillar guide remains fixed in an axial direction relative to the clamping bush. Thus the adjusted clearance between the gear wheel and the gear rack or the additional gear wheel is unchanged during the clamping process.

The clamping bush of the fastening device can secure the pillar guide in its position relative to the retaining element or carrier element in the loaded condition by means of a hydraulic clamp. This not only enables a radial clamping of the pillar guide without altering the adjusted axial clearance between the gear wheel and the gear rack or the additional gear wheel, but also means that there is a damping of the vibration which occurs during the operation of the linear actuator due to meshing between the gear wheel and the gear rack or the additional gear wheel.

An adjusting element can be provided between the pillar guide and the clamping bush, for the adjustment of the gap between the gear wheel and the gear rack or between both gear wheels, which positions the pillar guide relative to the clamping bush. This enables a separation to be achieved between the tooth tip clearance adjustment on the one hand and the clamping process between the clamping bush and the pillar guide on the other. This permits an increased level of accuracy to be achieved in the clearance adjustment.

In some embodiments, the adjusting device can be designed as a manual adjusting element, in particular as an adjusting screw, which is arranged between the retaining or carrier element and the pillar guide. The adjusting bolt is a cost-efficient and simple option. The adjusting belt can be connected to the carrier or retaining element and/or to a clamping plate connected to the carrier or retaining element and acts on the pillar guide.

Alternatively, an actuator can be provided which is operated electrically, hydraulically and/or pneumatically.

The clamping bush can comprise a cylindrical shaft and a flange connected to the end of the cylindrical shaft. As a result, the clamping bush can be inserted in a simple fashion into a retaining element and can be clamped and secured via the flange between a clamping plate and the carrier element or retaining element by simple means.

The clamping bush can comprise a pressure chamber in the cylindrical shaft, in which a pressurizing medium is provided, which can be pressurized via a pressure screw. Such a hydromechanical clamping bush enables a fast and simple application of a clamping force via the pressure screw. The clamping force can be released just as quickly using the pressure screw. This hydromechanical clamping bush is advantageous in that it is completely self-contained, such that there is no outlet for the pressurizing medium. Such a hydromechanical clamping bush can be secured to, or inserted in, the retaining or carrier element in a simple fashion.

A piston with a seal can be provided between the pressure screw and the pressure chamber, which can be moved axially in a pre-pressure chamber bore for the pressurization of the pressure chamber. Thus the clamping bush can be switched from an unclamped to a clamped condition by actuating the screw. Such a clamping device is also simple to operate and is not subject to wear.

The pillar guide can also comprise a contact surface at one end, on which is either directly or indirectly arranged a fixing element of the gear wheel or of the gear rack or the additional gear wheel accommodated in the pillar guide. This arrangement facilitates a compact construction of the clearance adjustment device, in which the fixing element can be provided within the pillar guide. This fastening element can be supported by a stepped bore in the pillar guide, such that a fixing element constructed as a clamping screw is integrated in the pillar guide and the gear rack or the additional gear wheel or additional components are secured to the contact surface. The additional components can be, for example, a guide block of a linear guide. Moreover, the pillar guide can have a locating face at one end for the adjustment of the axial position within the clamping bush. The adjusting element comes into direct contact with this locating face for the exact tooth tip clearance adjustment.

In some aspects of the invention, a linear actuator comprises a mechanism for gear tooth clearance adjustment in the method described above, wherein the linear actuator has a motor driving the gear wheel which acts in conjunction with the gear rack or additional gear wheel. Thus a fast and secure tooth tip clearance adjustment can be achieved using such linear actuators. In particular, a simple adjustment for long gear racks is possible.

In some embodiments, the clearance adjustment device with the clamping device is fixed on or in the carrier element, and the gear rack is fixed to the locating face of the pillar guide with a clamping screw incorporated in the pillar guide. This again facilitates a simple construction and provides for a direct adjustment of the clearance between the gear rack and the gear wheel. The gear wheel on the motor can be arranged to be moveable along the base body on a linear guide, to which also the carrier element for acceptance of the clamping device is held in place or connected integrally. The motor can accommodate, for example, a traversable tool holder, workpiece holder or the like.

In some embodiments, the clearance adjustment device with the clamping device is fixed on or in the retaining element by means of the fastening device, which carries the motor and drives the gear wheel, whereby the gear rack is connected to a base, on which a guide rail of a linear bearing is arranged, and a guide block of the linear guide is fastened with a fixing element in the pillar guide to the attachment on the pillar guide. In this arrangement, the gear rack is rigidly fixed to the base body and the gear wheel is adjusted in conjunction with the motor in determining its clearance relative to the gear rack.

According to an additional embodiment, a clamping device can be provided at one or both ends of a gear rack and/or the gear wheel, respectively. By this means a constant tooth tip clearance can be obtained by adjustment over the entire length of the gear rack.

An additional alternative embodiment provides that the clearance adjustment device with the clamping device is fixed on or in the carrier element and the additional gear wheel is fixed with a bearing retainer attached to the pillar guide as the pillar guide contact surface. This enables a simple adjustment of the tooth clearance to be achieved for a pair of gear wheels in order to drive an additional drive shaft or an additional gear wheel.

Various embodiments and extensions thereof are described and illustrated in detail using the examples in the figures below. The features drawn from the description and the figures can be applied either individually or in any combination according to the present invention.

DETAILED DESCRIPTION

Figure 1:
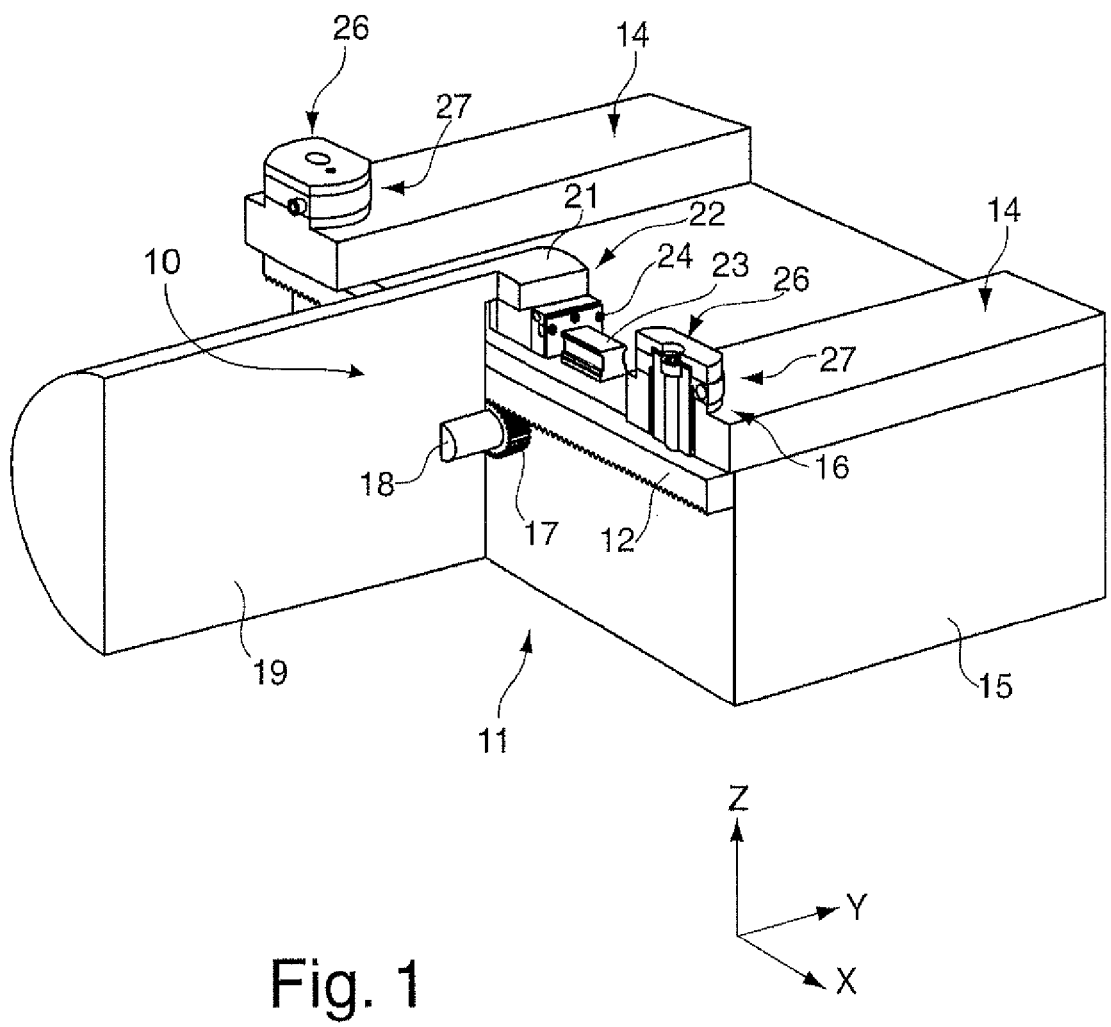
FIG. 1 is a perspective view of a first embodiment of a mechanism for gear clearance adjustment as a linear actuator.

In FIG. 1, a perspective view of a linear actuator 11 is depicted with a mechanism 10 for tooth clearance adjustment. The mechanism 10 for tooth clearance adjustment comprises a retaining element 21, on which a gear wheel 17 is mounted. This gear wheel 17 (e.g., first gear wheel) comes into contact with a gear rack 12 or an additional gear wheel (e.g., second gear wheel), which is contained or mounted via a carrier element 14. A clearance adjustment device 26 is illustrated in greater detail in FIGS. 2 to 4, which adjusts a gap A (shown in FIG. 3) between the gear wheel 17 and the gear rack 12 or between the gear wheel 17 and the additional gear wheel by means of a fastening device.

In the embodiment according to FIG. 1, the gear rack 12 is connected to the carrier element 14, which is in turn detachably connected to a base (or base body) 15. The carrier element 14 can also be designed as a single part in combination with the base 15. The base 15 can, for example, be part of a machine tool or processing machine, in particular a laser processing machine with a workpiece support and a cutting head, one or both of which can be moved relative to each other.

The gear wheel 17, which is linked to the drive system via an axle 18 with a motor 19 or a motor element, is in contact with the gear rack 12. The gear rack 12 and the gear wheel 17 can have the same tooth pitch. This motor 19 is controlled in its movement by the retaining element 21 with a linear guide 22 of the base 15 in, and in opposition to, the X-direction of the base 15. The linear guide 22 comprises a guide rail 23 connected to the base 15, along which a guide carriage or guide block 24 can be moved, with which the retaining element 22 is in contact.

The motor 19 can drive a movable unit. This can be, for example, a tool table, an additional linear guide unit, a receptacle for holding a tool, a component or a cutting tool.

The retaining element 21 and the carrier element 14 are arranged or mounted on a single common base 15. At least one (typically two) clearance adjustment devices 26 are provided on the carrier elements 14 of the base 15, which engage with the gear rack 12 and by means of which the tooth tip clearance between the gear rack 12 and the gear wheel 17 can be adjusted.

Figure 2:
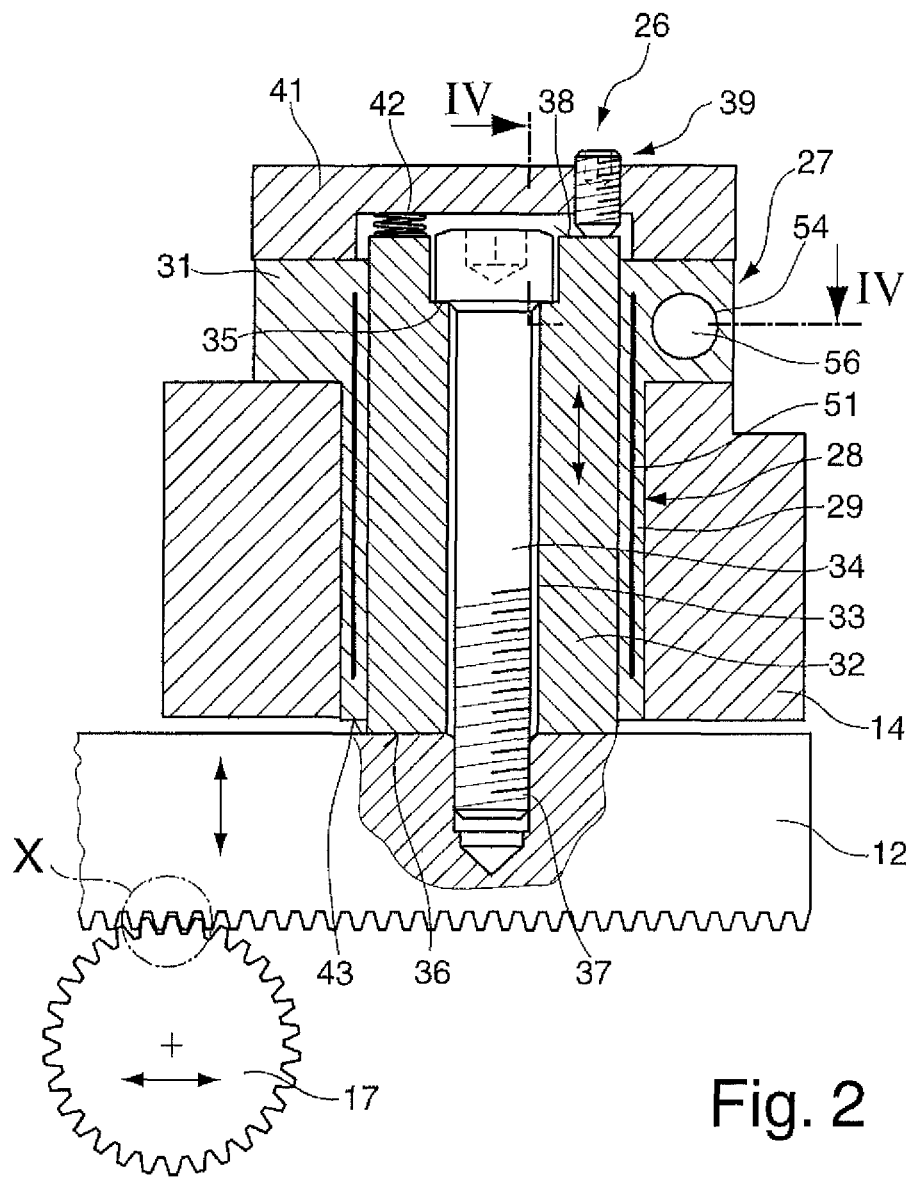
FIG. 2 is a schematic, enlarged sectional view of the clearance adjustment mechanism according to FIG. 1.

In FIG. 2, a schematic, enlarged sectional view of the clearance adjustment device 26 is depicted. This comprises at least the clamping device 27, a pillar guide 32 and an adjusting element 39. The clamping device 27 comprises a clamping bush 28, which has a cylindrical shaft 29 and a flange 31. The flange 31 is supported by the carrier element 14 so that the clamping bush 28 is secured in an axial direction. The cylindrical shaft 29 of the clamping bush 28 is inserted into the carrier element 14 and operated radially therein. The outer circumferential surface of the cylindrical shaft 29 rests against the wall of a bore in the carrier element 14. The pillar guide 32 is designed as a hollow cylindrical body and is located and can move in the cylindrical shaft 29 of the clamping bush 28 in the z-direction. This pillar guide 32 contains a fastening element 34, in particular a screw, in its central through-bore. For this, a stepped bore with a shoulder 35 can be provided, so that the fastening element 34, in particular the screw, can be completely integrated in the through-hole 33.

A contact surface 36 is provided at one end of the pillar guide 32, which serves as a contact with the gear rack 12. The fastening element 34 engages in a hole 37 of the gear rack 12, whereby the gear rack 12 is connected to the contact surface 36 via the fastening element 34. The pillar guide 32 of the contact surface 36 opposite has a locating surface 38, with which the adjusting element 39 engages, which is moreover enmeshed in the carrier element 14 and a clamping plate 41 of the carrier element 14. It is by means of this clamping plate 41, which can also be a component of the clearance adjustment device 26, that the flange 31 of the clamping bush 28 is connected to the carrier element 14 and secured in an axial direction.

Figure 6:
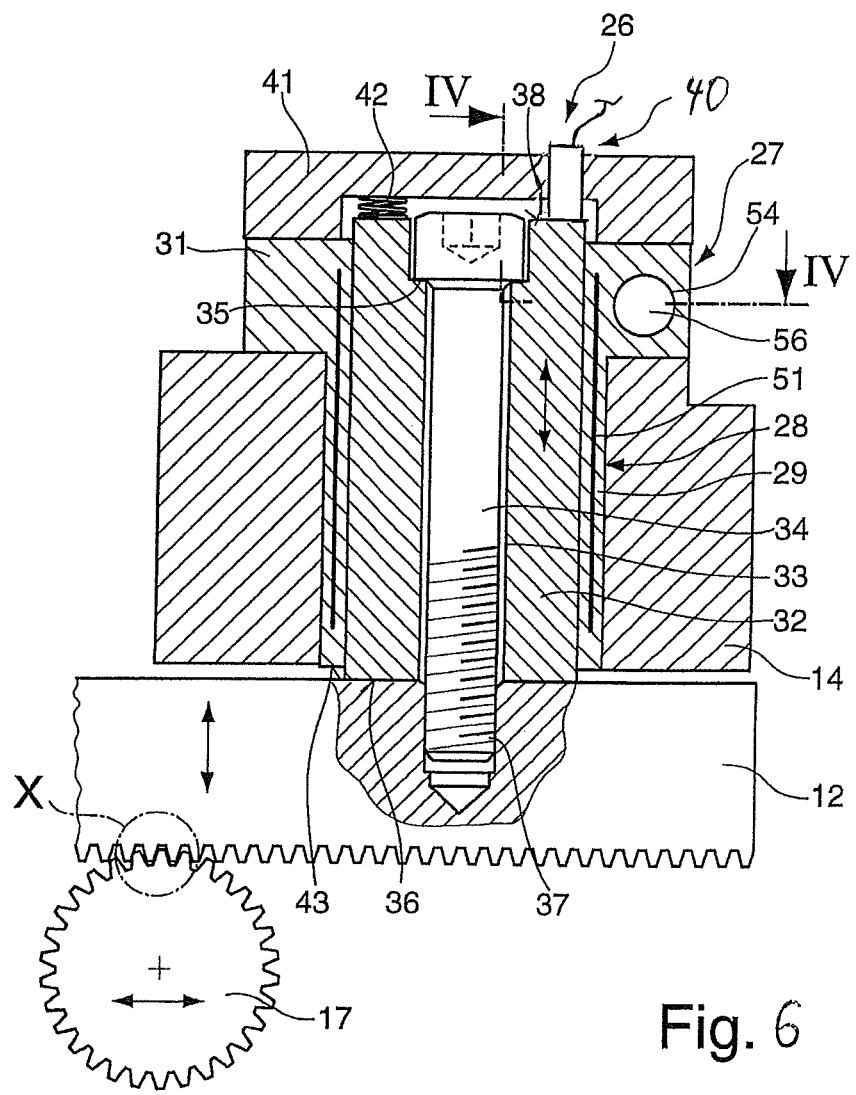
FIG. 6 is a schematic lateral view in partial sections of an alternative embodiment of a mechanism for gear clearance adjustment.

The adjusting element 39 is typically designed as an adjusting screw, with the help of which an axial positioning of the pillar guide 32 within the clamping bush 28 can be adjusted. This adjusting element 39 typically comprises a fine pitch thread, so that an exact adjustment of the pillar guide 32 is enabled on the z-axis, so that the tooth tip clearance between the gear rack 12 and the gear wheel 17 can be adjusted to a high level of accuracy. The pillar guide 32 has an axial length, which is typically designed to be the same size as, or larger than, the clamping bush 28. Alternatively, the pillar guide 32 and the adjusting element 39 can be designed in such a way that in each case, the contact surface 36 of the pillar guide 32 protrudes opposite a front face 43 of the clamping bush 28, which lies opposite the flange 31. Alternatively, the adjusting element can be designed as an actuator 40, as shown in FIG. 6.

In the cylindrical shaft 29 of the clamping bush 28, a pressure chamber 51 is provided, which at least partly extends to the flange 31. In the flange 31, a pressure screw 56 is arranged in an inlet pressure chamber 54, which is connected to the pressure chamber 51 via a pressure channel 53 (shown in FIG. 4).

Figure 3:
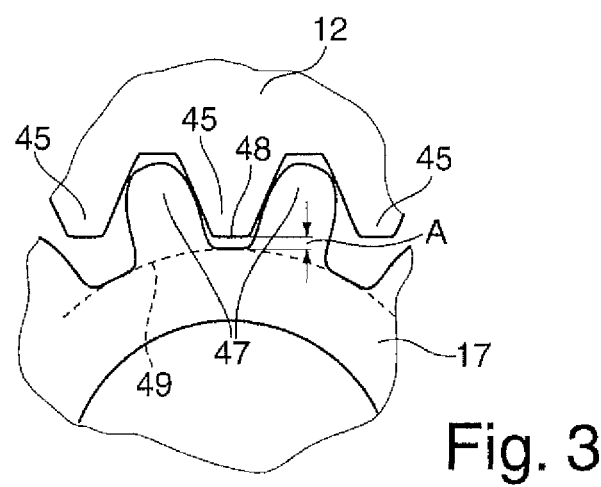
FIG. 3 is a schematic, enlarged detailed view of region X in FIG. 2.

In FIG. 3, a schematic, enlarged view of the detail X from FIG. 2 is depicted. This schematic, enlarged view shows a meshing of teeth 45 of the gear rack 12 with teeth 47 of the gear wheel 17 with a gap A. This gap A between a tooth tip 48 of the tooth 45 of the gear rack 12 and a root circle 49 of the gear wheel 17 is referred to as the tooth tip clearance. The adjustment of this gap is enabled in the exemplary embodiments according to FIGS. 1 to 3 by the displacement of the gear rack 12 towards the gear wheel 17 in the z-direction.

Figure 4:
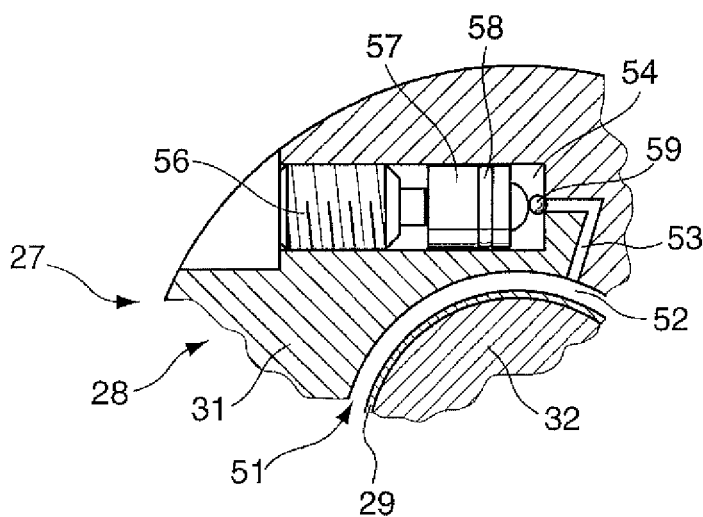
FIG. 4 is a schematic sectional view along the line IV-IV in FIG. 2.

In FIG. 4, a schematic, enlarged sectional view along the line IV-IV in FIG. 2 is depicted. A pressure chamber 51 is provided in the cylindrical shaft 29 of the clamping bush 28, which comprises, for example, a double-walled, in particular hardened, steel shell, which is filled with a pressure medium 52, in particular oil. This pressure chamber 51 is linked to an inlet pressure chamber 54 via the pressure channel 53, in which the pressure screw 56 is provided. This pressure screw 56 operates a piston 57, which has seal 58 for the sealing of the pressure medium against leaking. When the pressure screw 56 is operated, i.e. by screwing the pressure screw 56 into the inlet pressure chamber 54, the pressure piston 57 is moved into the inlet pressure chamber, leading to a build-up in pressure in the pressure chamber 51. Thus a radial clamping force is produced on the external area of the pillar guide 32, while the cylindrical shaft 29 is supported by the drill-hole wall of the carrier element 14, so that a uniform surface pressure is acting on the pillar guide 32. When the pressure screw 56 has been completely inserted, the pressure channel 53 is closed with a sealing element 59, in particular a metallic sphere, so that no pressure medium can leak from the pressure chamber 51. Thus the hydraulic clamping pressure on the pillar guide 32 is retained and ensured. In this position depicted in FIG. 4, the sealing element 59 closes off the pressure channel 53. The clamping bush 27 is in the clamped condition, i.e. the pillar guide 32 can no longer be moved back and forth in the z-direction.

The tooth tip clearance A can be adjusted as follows according to FIGS. 1 to 4:

The clamping bushes 28 of both fastening devices 27 are both reverted to an unloaded state, i.e. the pressure screw 56 is released in such a way that a gap occurs at the sealing element 59 of the pressure piston 57 to open up the pressure channel 53. Thus the pillar guide 32 in the clamping bush 28 can be moved axially in the z-direction. The gear rack 12 is positioned at a distance from the gear wheel 17 via the adjusting element 39, until the tooth tip clearance A has been adjusted. This is carried out in the same fashion for both adjustment devices 26. Then the pressure screw 56 is operated on both clearance adjustment devices 26 simultaneously or one after another, in order to revert the clamping bushes 28 from an unloaded to a loaded state. As the adjustment of the adjusting screw 39 and the position of the pillar guide 32 are unchanged during, and unaffected by, the clamping process of the fastening device, the adjusted tooth tip clearance A can be maintained and the pillar guide can be clamped in an exact adjusted position.

In some embodiments of the fastening device 27, such as shown in FIG. 2, a resetting element 42 can also operate between the clamping plate 41 and the pillar guide 32, which presses the pillar guide 32 against the adjusting element 39, so that on screwing in the adjusting element 39 in the z-direction against this reset force is established. In the arrangement depicted in FIG. 2, the gear rack 12 can be pushed by hand or by means of a device pushed or held against the adjusting element 39 in the unloaded condition until the clamping bush 28 is in a loaded condition.

In the linear actuator 11 depicted in FIGS. 1 to 4, the gear rack 12 can be moved relative to the gear wheel 17, and the clearance adjustment devices 26 enable the adjustment of the tooth tip clearance by altering the location of the gear rack 12 in the z-direction. In this embodiment, the motor 19 moves along the gear rack 12 along with the retaining element 21.

Figure 5:
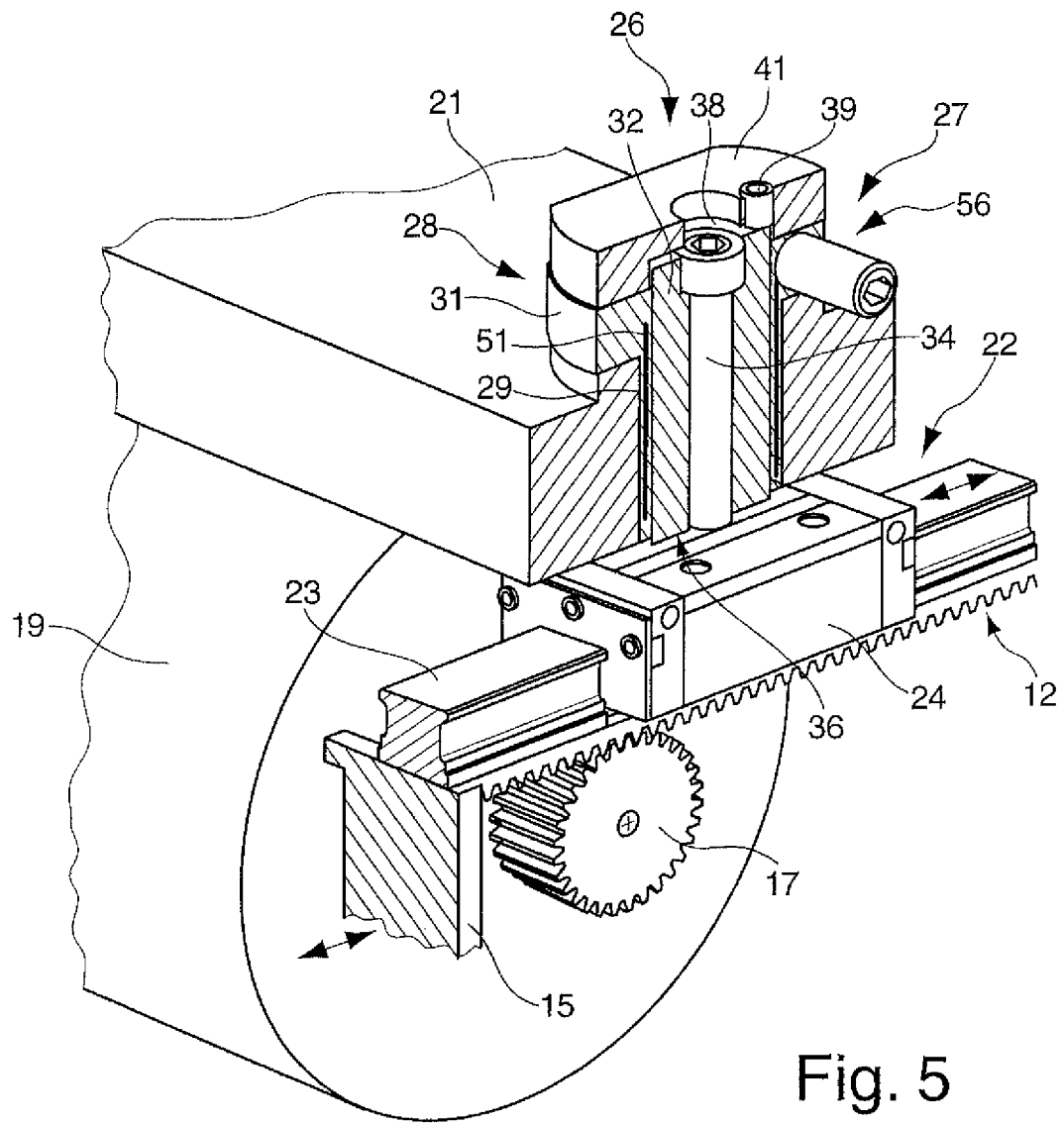
FIG. 5 is a perspective view in partial sections of an alternative embodiment of a mechanism for gear clearance adjustment.

In other embodiments, such as shown in FIG. 5, it is provided that the gear rack 12 is connected to the base 15 and that there is a transverse movement of the gear wheel 17 back and forth in the z-direction for the adjustment of the tooth tip clearance.

The design of the clearance adjustment device 26 shown in FIG. 2 is similar to the clearance adjustment device shown in FIG. 5, with the difference that the clearance adjustment device 26 is not incorporated in the carrier element 14, but rather in the retaining element 21, which carries the motor 19. The contact surface 36 of the pillar guide 32 is in contact with the guide block 24 of the linear guide 22, whereby the guide rail 23, along which the guide block 24 is moved, is attached to the base 15.

The adjustment of the tooth tip clearance between the gear rack 12 and the gear wheel 17 is carried out as follows:

The pillar guide 32 is attached to the base 15 via the guide block 24, which is in turn attached via the guide rail 23. By operating the adjusting element 39 while the clamping bush 28 is in an unloaded state, the retaining element 21, and therefore the motor 19 and the gear wheel 17 are pushed upwards in the z-direction. Once the tooth tip clearance has been adjusted, the pressure screw 56 is operated so that the fastening device 27 is placed in a loaded state for hydraulic clamping. The clamping bush 28 exerts a radial loading on the pillar guide 32.

The fastening device 27 can be operated in an unloaded state for the readjustment of tooth tip clearance, and the adjusting element 39 can be partly unscrewed from the clamping plate 41, whereby the gap between the engaged teeth 45, 47 of the gear wheel 17 and the gear rack 12 grows autonomously due to the weight of the motor 19. Then a renewed adjusting procedure can be undertaken, where the adjusting element 39 is screwed in and therefore the gap between the tooth tip 48 of the gear rack 12 and the root circle 49 of the gear wheel 17 is reduced until the desired or required gap A of the tooth tip clearance has been set.

A schematic side view as a partial section of an alternative embodiment to FIGS. 1 to 4 is depicted in FIG. 6. This embodiment differs from the embodiments in FIGS. 1 to 4 in that, instead of the gear rack 12, an additional (i.e., second) gear wheel 61 is provided via an arranged bearing axle 62, which is supported in a bearing 63. This bearing 63 is held, in the same way as the gear rack 12, by the retaining element 34 of the clamping device 27 of the clearance adjustment device 26.

The gear wheel 17 is mounted on the axle 18 and driven by the motor 19. The motor 19 can be attached to the base 15 via the retaining element 21. Alternatively, the motor 19 can also be connected directly to the base 15. The carrier element 14 is also connected to the base 15.

In this design, the gap A between the additional gear wheel 61 and the gear wheel 17 can be adjusted by means of the clearance adjustment device 26.

The gear wheel 61 can drive an additional gear wheel. Alternatively, the bearing axle 62 can have a connection position 64 at the opposite end to the bearing retainer 63, which can be designed to accept a coupling or coupling elements for an additional drive shaft or for the connection of an additional drive element. Alternatively, the bearing axle 62 on the front face of the bearing retainer 63 lying opposite the gear wheel 61 can protrude from the bearing 63, in order to attach a coupling element for an additional drive element or to directly attach an additional drive element to it.

A number of embodiments of the invention have been described. Nevertheless, it will be understood that various modifications may be made without departing from the spirit and scope of the invention. Accordingly, other embodiments are within the scope of the following claims.

What is claimed is:

1. A mechanism for gear clearance adjustment comprising:
   a retaining element, on which a first gear wheel is mounted;
   a carrier element, on which a gear rack or a second gear wheel is mounted; and
   at least one clearance adjustment device positioned on the carrier element or on the retaining element by a clamping device and changeable between an unloaded state for the adjustment of a gap in a radial direction between the first gear wheel and the gear rack or between the first gear wheel and the second gear wheel and a loaded state after the adjustment of the gap so as to secure the adjusted gap,
   wherein the clamping device comprises a clamping bush which contains a pillar guide which is connected directly or indirectly to the first gear wheel, the gear rack or the second gear wheel, whereby the pillar guide is moveable axially within the clamping bush when the clamping bush is in an unloaded state, and is not moveable axially within the clamping bush when the clamping bush is loaded in a radial direction, and wherein the clamping bush of the clamping device secures the pillar guide to the retaining element or carrier element in the loaded state by a hydraulic coupling.

2. The mechanism according to claim 1, wherein the clamping bush is inserted at least partially into the carrier element or the retaining element.

3. The mechanism according to claim 1, wherein the pillar guide is moveable relative to the clamping bush by an adjusting element for the adjustment of the gap between the first gear wheel and the gear rack or between the first gear wheel and the second gear wheel.

4. The mechanism according to claim 3, wherein the adjusting element is designed as an actuator or as a manual adjusting element.

5. The mechanism according to claim 4, wherein the adjusting element is an adjusting screw.

6. The mechanism according to claim 1, wherein the clamping bush comprises a cylindrical shaft with a pressure chamber contained within, in which a pressure medium is provided, which is pressurized by a pressure screw.

7. The mechanism according to claim 6, wherein a piston is provided between the pressure screw and the pressure chamber, which is moveable axially in an inlet pressure chamber for the application of pressure in the pressure chamber.

8. The mechanism according to claim 7, wherein the piston comprises a seal.

9. The mechanism according to claim 1, wherein the pillar guide comprises a contact surface at one end, on which the first gear wheel, the gear rack or the additional gear wheel is fastened directly or indirectly by a fastening element contained in the pillar guide.

10. A linear actuator comprising:
    a mechanism for gear clearance adjustment comprising:
       a retaining element, on which a first gear wheel is mounted;
       a carrier element, on which a gear rack or a second gear wheel is mounted; and
       at least one clearance adjustment device positioned on the carrier element or on the retaining element by a clamping device and changeable between an unloaded state for the adjustment of a gap in a radial direction between the first gear wheel and the gear rack or between the first gear wheel and the second gear wheel and a loaded state after the adjustment of the gap so as to secure the adjusted gap,
       wherein the clamping device comprises a clamping bush which contains a pillar guide which is connected directly or indirectly to the first gear wheel, the gear rack or the second gear wheel, whereby the pillar guide is moveable axially within the clamping bush when the clamping bush is in an unloaded state, and is not moveable axially within the clamping bush when the clamping bush is loaded in a radial direction, and
    a motor that drives the first gear wheel which operates in conjunction with the gear rack or the second gear wheel, wherein the clearance adjustment device is secured to or in the carrier element by the clamping device, and the gear rack is secured to a contact surface of the pillar guide by a fastening element contained within the pillar guide.

* * * * *